United States Patent [19]

Ryan

[11] Patent Number: 4,700,881
[45] Date of Patent: Oct. 20, 1987

[54] MULTIPLE FOIL TRANSIENT LIQUID PHASE BONDING

[75] Inventor: Edward J. Ryan, Wallingford, Conn.

[73] Assignee: United Technologies Corporation, Hartford, Conn.

[21] Appl. No.: 684,397

[22] Filed: Dec. 20, 1984

[51] Int. Cl.⁴ ............................................. B23K 20/00
[52] U.S. Cl. .............................. 228/194; 228/263.13; 428/637; 428/680
[58] Field of Search .......................... 228/194, 263.13; 428/637, 680

[56] References Cited

U.S. PATENT DOCUMENTS 4,038,041  7/1977  Duvall et al. ................. 228/194
4,122,992  10/1978  Duvall et al. ................. 228/194

Primary Examiner—Stephen J. Lechert, Jr.
Attorney, Agent, or Firm—Charles E. Sohl

[57] ABSTRACT

The bonding of materials by the transient liquid phase process is improved through the use of multiple boronized interlayer foils. By providing the interlayer in the form of multiple foils a reservoir of liquid material is formed during the bonding process which eliminates the previously encountered porosity. The use of multiple foils is especially appropriate when bonding fine grained materials.

6 Claims, 4 Drawing Figures

MULTIPLE FOIL TRANSIENT LIQUID PHASE BONDING

DESCRIPTION

TECHNICAL FIELD

The technical field of the invention is that of bonding metallic materials together, particularly superalloy articles and most particularly fine grain superalloy articles, by the transient liquid phase bonding process.

BACKGROUND ART

In the fabrication of high temperature articles, particularly gas turbine engine components, there is a demand for techniques for bonding articles together by a process which will produce a high strength joint. Most preferably the bond joint will be defect free and have a strength comparable to that of the articles being joined.

The transient liquid phase bonding process described in U.S. Pat. No. 3,678,570 addresses this problem and describes a process for bonding articles together at constant temperature. Briefly, boron containing nickel foil is placed between the articles to be bonded and the assembly of articles and foil is forced together and heated to a temperature at which the boronized portion of the interlayer foil melts but the articles being joined do not melt. When the assembly is held at this essentially constant temperature for some period of time the boron will diffuse into the unmelted portions of the assembly and eventually solidification will occur at the elevated temperature when the localized boron content is sufficiently reduced by diffusion. However, problems have been encountered employing this process in the bonding of fine grain materials.

It is believed that the problems encountered are related to the more rapid diffusion of boron in fine grain materials than in coarse grain materials. Fine grain materials have a substantially greater volume of grain boundary than coarse grain materials, and boron has a much greater diffusion rate in grain boundaries than in material away from the boundaries.

The foils employed in the transient liquid phase bonding process are rich in boron, boron being a very effective melting point depressant, and are typically produced by diffusing boron into the surface of the foil, for example, according to the teachings of U.S. Pat. No. 3,753,794.

DISCLOSURE OF INVENTION

The invention discloses the use of multiple foils in transient liquid phase bonding. By using two foils, each of which has boronized surfaces, upon heating to elevated temperatures the assembled foils will melt, both at their outer portions which are adjacent the articles being joined and, at the interface between the two foils. By providing a boron rich zone and consequently a liquid zone in the center of the foil assembly, the previously encountered tendency to form porosity is essentially eliminated. The invention process has particular utility in the bonding of fine grain superalloy articles in which porosity has previously been a problem.

The foregoing and other objects, features and advantages of the present invention will become more apparent from the following description of preferred embodiments and accompanying drawings.

BEST MODE FOR CARRYING OUT THE INVENTION

Figure 1:
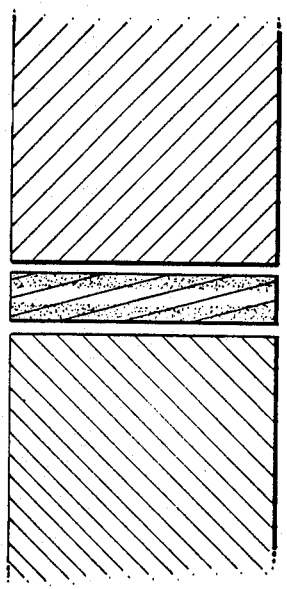
FIG. 1 illustrates transient liquid phase bonding according to the prior art.

FIG. 1 illustrates transient liquid phase bonding according to the prior art. In FIG. 1 two articles to be joined are shown with a single boronized foil between them. Upon assembly and heating to the appropriate temperature melting of the two boron rich regions (adjacent the surfaces being joined) will occur and subsequently, solidification of the melted regions will occur isothemally as a result of the diffusion of boron into the articles being joined. As previously noted there have problems encountered relating to porosity which forms during this bonding process particularly when fine grain articles are being bonded.

In the context of this invention, fine grain articles are defined as those having an average grain size of ASTM 5 or finer, although obviously the application of transient liquid phase bonding processes to other nickel base alloys may require some adjustment of this definition.

Figure 2:
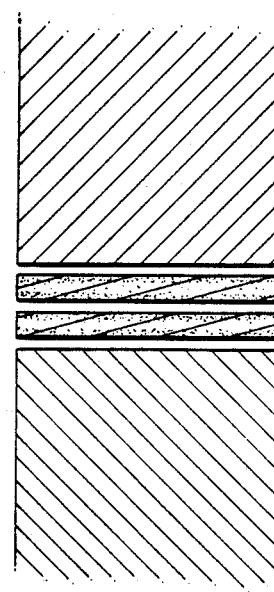
FIG. 2 illustrates the present invention and shows the juxtaposition of two boronized foils between articles to be joined.

FIG. 2 shows the relationship of the assembly of the present invention, and shows the use of two foils between the articles to be joined.

Figure 3:
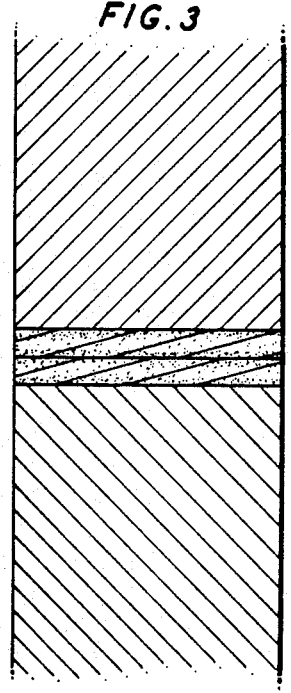
FIG. 3 illustrates the assembled articles under the action of a force which urges the articles together.

Each foil has a boronized surface rich in boron, according to the teachings of U.S. Pat. No. 3,753,794. When the foils are assembled between the articles and held together under a bonding force as shown in FIG. 3 it can be seen that a boron rich zone exists in the center of the assembly. Because two boronized surfaces contact each other at the center of the assembly the boron content in the center of the assembly is approximately twice the boron content at the junction between the foils and the surfaces being joined.

Upon heating to the appropriate temperature, melting will occur in three regions according to the present invention, the boronized regions immediately adjacent the surfaces to be joined, and the doubly thick boronized region in the center of the assembly. In the prior art, porosity was observed immediately adjacent the surfaces of the articles being joined, this porosity is believed related to the diffusion of boron into the articles being joined. Particularly severe porosity problems were encountered in bonding fine grained articles and this is attributed to rapid diffusion of boron in the grain boundaries of such materials.

Figure 4:
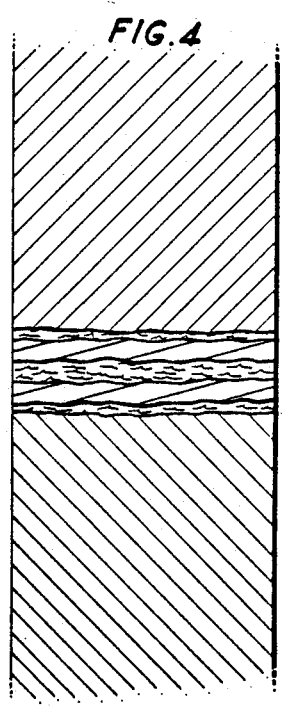
FIG. 4 illustrates the assembly of multiple foils between the articles being joined during the initial stages of the process illustrating the areas where melting occurs.

Referring to FIG. 4, the provision of a liquid zone in the center of the articles being joined permits the filling or elimination of the porosity, whether by direct liquid infiltration or by virtue of the fact that the layer separating the articles being joined is more flexible and more mushy and generally better able to fill porosity. In this context it will be noted that because the liquid layer in the center of the assembly is approximately twice the thickness of the liquid layers immediately adjacent the articles being joined, and because the boron in the center liquid layer cannot readily diffuse into the articles being joined, the last liquid to solidify in the assembly of FIG. 4 will be that liquid in the center of the articles being joined and this further ensures that minimal porosity will result.

Use of multiple foils also permits a general reduction in the total boron content in the joint region. Whereas in the single layer bonding process boron contents from about 2 to about 3.5 weight percent boron were tyical, in the present multiple layer foil approach boron contents of from 1.5 to b 2.5 and preferably from 1.75 to 2.25 weight percent are contemplated and in fact the provision of a higher boron content will lead to excessive melting and renewed likelihood of porosity. Typical foil thicknesses will be from about 0.005 to about 0.0005 to 0.005 inch.

Thus, for example, in bonding of articles made of IN 100 material (nominal composition 12.4% Cr, 18.5% Co, 3.2% Mo, 4.3% Ti, 5.0% Al, 0.4% Hf, 1.4% Cb, 0.02% B, 0.06% Zr, balance Ni), having a typical grain size of ASTM 8-10, using an interlayer having a nominal composition of nickel-15% chrome-X% boron, when a single layer was used containing 2.7% boron, porosity was observed, whereas when bonding was performed with multiple layers 0.001 or 0.002 inch thick containing from 1.8 to 2.27% boron porosity free joints were produced.

The process of the invention can be employed in diffusion bonding nickel base alloys for many applications, particularly in gas turbine engines.

Although this invention has been shown and described with respect to a preferred embodiment, it will be understood by those skilled in this art that various changes in form and detail thereof may be made without departing from the spirit and scope of the claimed invention.

I claim:

1. Method for reducing porosity in the joining of nickel base superalloy articles having matching surfaces between which a bond is desired including the steps of:
   a. providing at least two bonding foils between the matching surfaces, each of said foils having essentially the same base composition and having boron enriched surfaces;
   b. providing means to urge the matching surfaces and intervening foils together;
   c. heating the articles/foil combination to a temperature at which the boron rich portions of the foils melt but the articles being joined do not melt;
   d. holding the combination at said temperature for a time sufficient to permit the boron to diffuse into the article being joined thereby raising the melting point of the melted material and causing isothermal solidification to occur whereby the liquid region which forms between the foils provides sufficient material to feed and fill any porosity which would otherwise occur during the process if a single foil were utilized.

2. A method as in claim 1 in which at least one of the articles being joined has an average grain size of ASTM 5 or finer.

3. A method as in claim 1 in which three foils are placed between the articles being joined.

4. A method as in claim 1 in which the thickness of the foils is from about 0.0005 to about 0.005 in.

5. A method as in claim 1 in which the total boron content of the foils is from about 1.5 to about 2.5%.

6. A foil assembly for joining nickel base articles which comprise at least two nickel base foils having essentially the same base composition and having boron enriched surfaces and arranged in juxtaposition so that during joining a boron rich region is provided within the foil assembly.

* * * * *